(12) United States Patent
Devendorf et al.

(10) Patent No.: US 12,480,423 B2
(45) Date of Patent: Nov. 25, 2025

(54) SYSTEM AND METHOD FOR MITIGATING BOWED ROTOR IN A GAS TURBINE ENGINE

(71) Applicant: General Electric Company, Schenectady, NY (US)

(72) Inventors: Brian Lewis Devendorf, Georgetown, MA (US); Christopher Michael Chapman, Boston, MA (US); Arthur William Sibbach, Boxford, MA (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 17/126,698

(22) Filed: Dec. 18, 2020

(65) Prior Publication Data

US 2022/0195886 A1   Jun. 23, 2022

(51) Int. Cl.
| | |
|---|---|
| *F01D 21/00* | (2006.01) |
| *F01D 15/10* | (2006.01) |
| *F01D 19/00* | (2006.01) |
| *F01D 21/12* | (2006.01) |
| *F01D 21/20* | (2006.01) |
| *F01D 25/36* | (2006.01) |
| *F02C 7/275* | (2006.01) |

(52) U.S. Cl.
CPC ............ *F01D 21/00* (2013.01); *F01D 15/10* (2013.01); *F01D 19/00* (2013.01); *F01D 21/003* (2013.01); *F01D 21/12* (2013.01); *F01D 21/20* (2013.01); *F01D 25/36* (2013.01); *F02C 7/275* (2013.01); *F05D 2220/323* (2013.01); *F05D 2270/112* (2013.01); *F05D 2270/3032* (2013.01)

(58) Field of Classification Search
CPC .......... F02C 7/268; F02C 7/275; F01D 25/34; F01D 25/36; F01D 21/00; F01D 21/20; F01D 19/00; B64D 2045/0085; F05D 2260/80
See application file for complete search history.

(56) References Cited

U.S. PATENT DOCUMENTS

| | | | | |
|---|---|---|---|---|
| 6,321,526 B1 * | 11/2001 | Hamana | .................. | F02C 7/268 60/788 |
| 7,188,475 B2 * | 3/2007 | McGinley | ............... | F02C 7/275 60/726 |

(Continued)

FOREIGN PATENT DOCUMENTS

WO    WO-2018177942 A1 * 10/2018 ............. F01D 19/02

*Primary Examiner* — Alain Chau
(74) *Attorney, Agent, or Firm* — Venable LLP; Duarte Y Ho; Michele V. Frank (57) ABSTRACT

A turbomachine for a vehicle is provided. The turbomachine includes a first rotatable component; a first power source operatively coupled with the first rotatable component; a second power source selectively coupled with the first rotatable component; and a controller having one or more processors and one or more memory devices, the one or more memory devices storing instructions that when executed by the one or more processors cause the one or more processors to perform operations, in performing the operations, the one or more processors are configured to: receive an input indicating an engine shutdown of the turbomachine; and in response to the engine shutdown, cause the second power source to provide power to and rotate the first rotatable component.

19 Claims, 6 Drawing Sheets

(56) References Cited

U.S. PATENT DOCUMENTS

| | | | |
|---|---|---|---|
| 8,918,264 B2 | 12/2014 | Jegu et al. | |
| 9,260,976 B2* | 2/2016 | Phillips | G05B 19/048 |
| 9,593,591 B2* | 3/2017 | Phillips | G07C 5/0808 |
| 9,664,070 B1* | 5/2017 | Clauson | F01D 25/36 |
| 9,950,705 B2 | 4/2018 | Gibson et al. | |
| 9,963,995 B2* | 5/2018 | Doebbeling | F01D 15/10 |
| 9,970,328 B2 | 5/2018 | Haerms et al. | |
| 10,428,682 B2* | 10/2019 | Coldwate | F01D 25/36 |
| 10,508,601 B2* | 12/2019 | Sheridan | F02C 7/268 |
| 11,062,532 B2* | 7/2021 | Culpin | B64F 5/60 |
| 11,378,061 B2* | 7/2022 | Epstein | F01D 15/10 |
| 11,549,392 B2* | 1/2023 | Dhabade | F02C 7/268 |
| 11,671,040 B2 | 6/2023 | Smith et al. | |
| 2014/0150446 A1* | 6/2014 | Eisenhauer | F02C 7/268 60/788 |
| 2014/0225428 A1* | 8/2014 | Campbell | G01R 31/392 324/426 |
| 2014/0271114 A1* | 9/2014 | Phillips | G05B 19/048 415/118 |
| 2014/0366546 A1* | 12/2014 | Bruno | F02C 9/00 60/722 |
| 2015/0098792 A1* | 4/2015 | Doebbeling | F01D 21/003 415/1 |
| 2015/0308347 A1* | 10/2015 | Smith | F01D 15/10 60/778 |
| 2017/0139015 A1* | 5/2017 | Sperling | G01R 31/392 |
| 2017/0234166 A1* | 8/2017 | Dube | H01L 35/30 60/779 |
| 2017/0234167 A1 | 8/2017 | Stachowiak et al. | |
| 2017/0234232 A1* | 8/2017 | Sheridan | F02C 7/275 307/9.1 |
| 2017/0234234 A1 | 8/2017 | Pech et al. | |
| 2018/0010480 A1 | 1/2018 | Hockaday et al. | |
| 2018/0201386 A1* | 7/2018 | Strauss | B64C 27/12 |
| 2018/0202315 A1* | 7/2018 | Coldwate | H02K 11/25 |
| 2018/0230946 A1 | 8/2018 | Virtue, Jr. et al. | |
| 2018/0274390 A1* | 9/2018 | Clauson | F01D 21/00 |
| 2018/0274443 A1 | 9/2018 | Pointon et al. | |
| 2018/0355764 A1* | 12/2018 | Clauson | F01D 21/20 |
| 2019/0128141 A1 | 5/2019 | Pech et al. | |
| 2019/0186289 A1* | 6/2019 | Dhabade | F01D 21/12 |
| 2019/0186359 A1* | 6/2019 | Stevenson | F02C 7/32 |
| 2019/0360462 A1* | 11/2019 | Epstein | F03D 7/0296 |
| 2020/0026269 A1* | 1/2020 | Needham | H02P 23/14 |
| 2020/0040811 A1* | 2/2020 | Zheng | F02B 39/10 |
| 2020/0074762 A1* | 3/2020 | Culpin | B64D 45/00 |
| 2020/0103950 A1* | 4/2020 | Halsey | H02J 9/061 |
| 2020/0231064 A1* | 7/2020 | Zhao | B60L 50/64 |

\* cited by examiner

SYSTEM AND METHOD FOR MITIGATING BOWED ROTOR IN A GAS TURBINE ENGINE

FIELD

The present disclosure relates generally to systems and methods for reducing, mitigating, or eliminating thermal bowing in gas turbine engines.

BACKGROUND

Gas turbine engines, such as those providing propulsion for aircraft, generate heat at the rotor assemblies during operation. Following shutdown of the engine, the rotor assembly is stationary (i.e., not rotating), which generally results in asymmetric heat distribution or thermal gradients circumferentially and/or axially along the rotor assembly. Such thermal gradients may generally result in thermal bowing or bowed rotor, such as along the radial, axial, and/or circumferential directions. Bowed rotor results in relatively large eccentricity relative to one or more casings surrounding the rotor assembly. As such, when a rotor assembly resumes operation, such eccentricity may generally cause the rotor assembly to operate with undesirable magnitudes of vibrations such as to damage surrounding casings, bearing assemblies, load structures, etc. Furthermore, such operation of the engine may result in airfoil blade tips rubbing into the surrounding casing, resulting in damage to the blades, the casings, or both.

Known methods to reduce rotor bow include allowing the rotor assembly to rest until the thermal gradient has naturally decreased over time such as to remove or eliminate the bowed rotor condition. However, in various instances, an engine may need to restart sooner than free convection heat transfer may allow. As such, there is a need for systems for reducing the thermal gradient of the rotor assembly such as to mitigate rotor bow in gas turbine engines.

BRIEF DESCRIPTION

Aspects and advantages of the invention will be set forth in part in the following description, or may be obvious from the description, or may be learned through practice of the invention.

In one exemplary embodiment of the present disclosure, a turbomachine for a vehicle is provided. The turbomachine includes a first rotatable component; a first power source operatively coupled with the first rotatable component; a second power source selectively coupled with the first rotatable component; and a controller having one or more processors and one or more memory devices, the one or more memory devices storing instructions that when executed by the one or more processors cause the one or more processors to perform operations, in performing the operations, the one or more processors are configured to: receive an input indicating an engine shutdown of the turbomachine; and in response to the engine shutdown, cause the second power source to provide power to and rotate the first rotatable component.

In certain exemplary embodiments the turbomachine includes a torque source operatively coupled with the first rotatable component and selectively coupled to the first power source and the second power source.

In certain exemplary embodiments when the one or more processors cause the second power source to provide power to and rotate the first rotatable component, the second power source provides electrical power to the torque source to apply torque to and rotate the first rotatable component.

In certain exemplary embodiments the first power source provides electrical power to the torque source to apply torque to and rotate the first rotatable component at an initial engine start of the turbomachine.

In certain exemplary embodiments the second power source comprises a rechargeable battery, and the torque source comprises an engine alternator.

In certain exemplary embodiments the controller includes a health and status monitoring system that indicates a status of the rechargeable battery.

In certain exemplary embodiments the controller includes a health and status monitoring system that indicates a status of the torque source.

In certain exemplary embodiments the one or more processors of the controller control the second power source to provide power to and rotate the first rotatable component at a speed of less than 10 RPM.

In certain exemplary embodiments the one or more processors of the controller control the second power source to provide less than 1 kW of electrical power to rotate the first rotatable component.

In certain exemplary embodiments the one or more processors of the controller control the second power source to provide power to and rotate the first rotatable component for a duration of at least ninety (90) minutes.

In certain exemplary embodiments the one or more processors of the controller control the second power source to provide power to and rotate the first rotatable component until the second power source is depleted.

In certain exemplary embodiments the first rotatable component is an engine shaft of the turbomachine.

In another exemplary embodiment of the present disclosure, a turbomachine for a vehicle is provided. The turbomachine includes a first rotatable component; a torque source operatively coupled with the first rotatable component; a first power source coupled to the torque source; a second power source selectively coupled to the torque source; and a controllable device operably coupled to the second power source such that the controllable device causes the second power source to provide electrical power to the torque source to apply torque to and rotate the first rotatable component in response to an engine shutdown of the turbomachine.

In certain exemplary embodiments the first power source provides electrical power to the torque source to apply torque to and rotate the first rotatable component at an initial engine start of the turbomachine.

In certain exemplary embodiments the second power source comprises a rechargeable battery, and the torque source comprises an engine alternator.

In certain exemplary embodiments the controllable device includes a health and status monitoring system that indicates a status of the rechargeable battery.

In certain exemplary embodiments the controllable device causes the second power source to provide power to and rotate the first rotatable component at a speed of less than 10 RPM.

In certain exemplary embodiments the controllable device causes the second power source to provide less than 1 kW of electrical power to the torque source to apply torque to and rotate the first rotatable component in response to the engine shutdown of the turbomachine.

In an exemplary aspect of the present disclosure, a method is provided for mitigating bowed rotor for a turbomachine having a first power source and a second power source. The method includes receiving, by one or more computing devices, an input indicating an engine shutdown of the turbomachine; in response to the received input indicating the engine shutdown of the turbomachine, causing, by the one or more computing devices, the second power source to provide electrical power to a torque source to apply torque to and rotate a first rotatable component.

In certain aspects the first power source provides electrical power to the torque source to apply torque to and rotate the first rotatable component at an initial engine start of the turbomachine, wherein the second power source comprises a rechargeable battery, and wherein the torque source comprises an engine alternator.

These and other features, aspects and advantages of the present subject matter will become better understood with reference to the following description and appended claims. The accompanying drawings, which are incorporated in and constitute a part of this specification, illustrate embodiments of the subject matter and, together with the description, explain the principles of the subject matter.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin. Here and throughout the specification and claims, range limitations are combined and interchanged, such ranges are identified and include all the sub-ranges contained therein unless context or language indicates otherwise.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A turbomachine of the present disclosure includes a control system and a second power source that can be controlled to cause the second power source to provide power to and rotate a first rotatable component in response to an engine shutdown of the turbomachine. For example, the control system causes the second power source to provide electrical power to a torque source to apply torque to and rotate the first rotatable component. The turbomachine includes a first power source that provides electrical power to the torque source to apply torque to and rotate the first rotatable component at an initial engine start of the turbomachine.

The engine of the present disclosure is operable to include a motor controller and a second power source in communication with a torque source to rotate a first rotatable component at a low speed following engine shutdown. Advantageously, this prevents rotor thermal bow by rotating the engine at a very low speed for a fixed number of minutes or until an integrated power source is depleted. For example, in an exemplary embodiment, the one or more processors of the controller control the second power source to provide power to and rotate the first rotatable component for a duration of at least ninety (90) minutes. In another exemplary embodiment, the one or more processors of the controller control the second power source to provide power to and rotate the first rotatable component until the second power source is depleted. In an exemplary embodiment, the one or more processors of the controller control the second power source to provide less than 1 kW of electrical power to rotate the first rotatable component. In an exemplary embodiment, the one or more processors of the controller control the second power source to provide power to and rotate the first rotatable component at a speed of less than 100 RPM. In another exemplary embodiment, the one or more processors of the controller control the second power source to provide power to and rotate the first rotatable component at a speed of less than 10 RPM.

Figure 1:
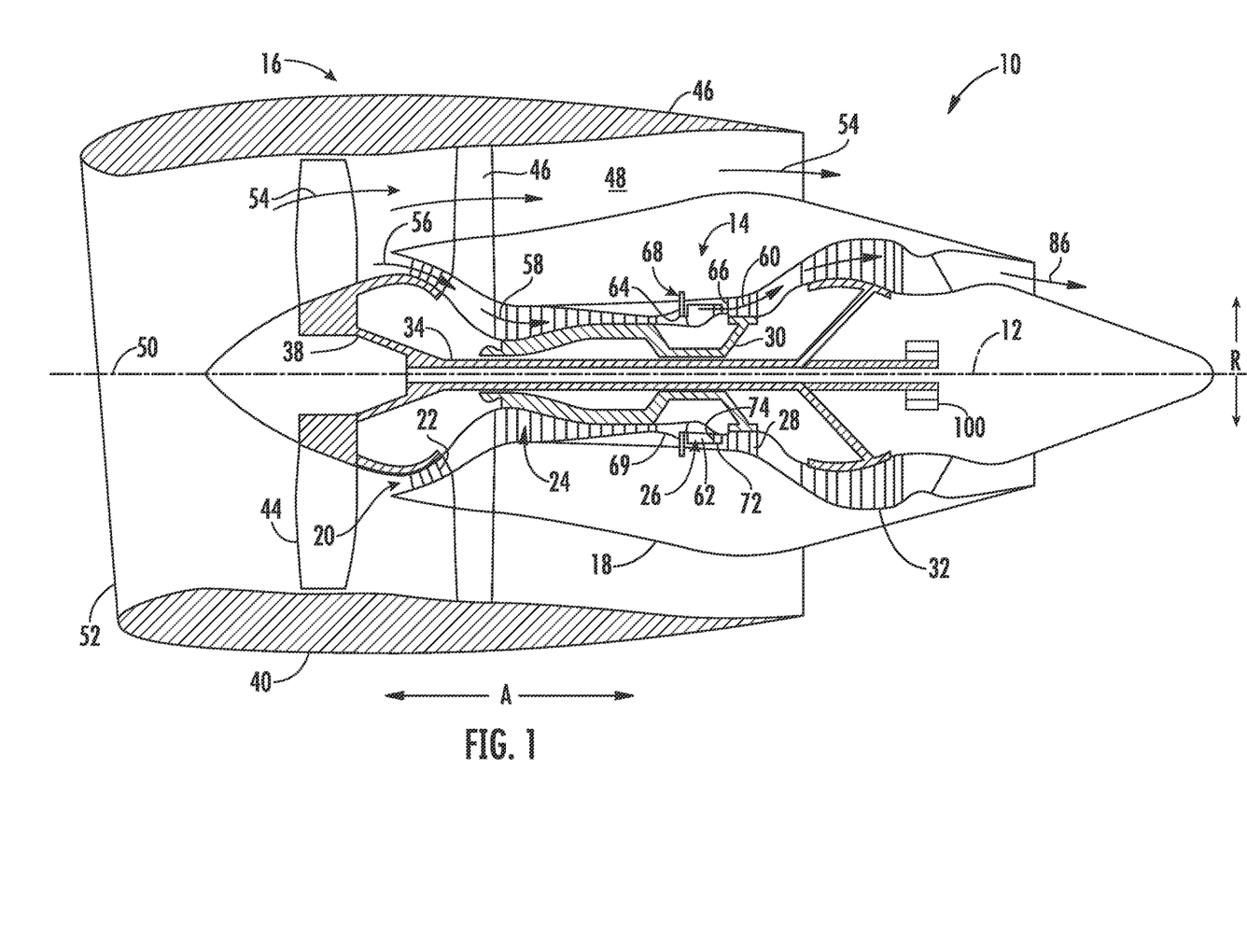
FIG. 1 is a schematic cross-sectional view of an exemplary gas turbine engine in accordance with exemplary embodiments of the present disclosure.

FIG. 1 provides a schematic cross-sectional view of an exemplary turbomachine as may incorporate various embodiments of the present disclosure. Particularly, FIG. 1 provides an aviation high-bypass turbofan engine herein referred to as "turbofan 10". The turbofan 10 of FIG. 1 can be mounted to an aerial vehicle, such as a fixed-wing aircraft, and can produce thrust for propulsion of the aerial vehicle. For reference, the turbofan 10 defines an axial direction A, a radial direction R, and a circumferential direction. Moreover, the turbofan 10 defines an axial centerline or longitudinal axis 12 that extends therethrough for reference purposes. In general, the axial direction A extends parallel to the longitudinal axis 12, the radial direction R extends outward from and inward to the longitudinal axis 12 in a direction orthogonal to the axial direction A, and the circumferential direction extends three hundred sixty degrees (360°) around the longitudinal axis 12.

The turbofan 10 includes a core gas turbine engine 14 and a fan section 16 positioned upstream thereof. The core engine 14 includes a tubular outer casing 18 that defines an annular core inlet 20. The outer casing 18 further encloses and supports a booster or low pressure compressor 22 for pressurizing the air that enters core engine 14 through core inlet 20. A high pressure, multi-stage, axial-flow compressor 24 receives pressurized air from the LP compressor 22 and further increases the pressure of the air. The pressurized air stream flows downstream to a combustor 26 where fuel is injected into the pressurized air stream and ignited to raise the temperature and energy level of the pressurized air. The high energy combustion products flow from the combustor 26 downstream to a high pressure turbine 28 for driving the high pressure compressor 24 through a high pressure spool 30 or a second rotatable component. The high energy combustion products then flow to a low pressure turbine 32 for driving the LP compressor 22 and the fan section 16 through a low pressure spool 34 or a first rotatable component. The LP spool 34 is coaxial with the HP spool 30 in this example embodiment. After driving each of the turbines 28 and 32, the combustion products exit the core engine 14 through an exhaust nozzle 36 to produce propulsive thrust.

The fan section 16 includes a rotatable, axial-flow fan rotor 38 that is surrounded by an annular fan casing 40. The fan casing 40 is supported by the core engine 14 by a plurality of substantially radially-extending, circumferentially-spaced outlet guide vanes 42. In this way, the fan casing 40 encloses the fan rotor 38 and a plurality of fan blades 44. A downstream section 46 of the fan casing 40 extends over an outer portion of the core engine 14 to define a bypass passage 48. Air that passes through the bypass passage 48 provides propulsive thrust as will be explained further below. In some alternative embodiments, the LP spool 34 may be connected to the fan rotor 38 via a speed reduction device, such as a reduction gear gearbox in an indirect-drive or geared-drive configuration. Such speed reduction devices can be included between any suitable shafts/spools within the turbofan 10 as desired or required.

During operation of the turbofan 10, an initial or incoming airflow, represented by arrow 50, enters the turbofan 10 through an inlet 52 defined by the fan casing 40. The airflow 50 passes through the fan blades 44 and splits into a first air flow (represented by arrow 54) that moves through the bypass passage 48 and a second air flow (represented by arrow 56) which enters the LP compressor 22 through the core inlet 20.

The pressure of the second airflow 56 is progressively increased by the LP compressor 22 and then enters the HP compressor 24, as represented by arrow 58. The discharged pressurized air stream flows downstream to the combustor 26 where fuel is introduced to generate combustion gases or products. The combustion products 60 exit the combustor 26 and flow through the HP turbine 28. The combustion products 60 then flow through the LP turbine 32 and exit the exhaust nozzle 36 to produce thrust. Moreover, as noted above, a portion of the incoming airflow 50 flows through the bypass passage 48 and through an exit nozzle defined between the fan casing 40 and the outer casing 18 at the downstream section 46 of the fan casing 40. In this way, substantial propulsive thrust is produced.

As further shown in FIG. 1, the combustor 26 defines an annular combustion chamber 62 that is generally coaxial with the longitudinal centerline axis 12, as well as an inlet 64 and an outlet 66. The combustor 26 receives an annular stream of pressurized air from a high pressure compressor discharge outlet 69. A portion of this compressor discharge air ("CDP" air) flows into a mixer (not shown). Fuel is injected from a fuel nozzle 68 to mix with the air and form a fuel-air mixture that is provided to the combustion chamber 62 for combustion. Ignition of the fuel-air mixture is accomplished by a suitable igniter, and the resulting combustion gases 60 flow in an axial direction A toward and into an annular, first stage turbine nozzle 72. The nozzle 72 is defined by an annular flow channel that includes a plurality of radially-extending, circumferentially-spaced nozzle vanes 74 that turn the gases so that they flow angularly and impinge upon the first stage turbine blades of the HP turbine 28. For this embodiment, the HP turbine 28 rotates the HP compressor 24 via the HP spool 30 and the LP turbine 32 drives the LP compressor 22 and the fan rotor 38 via the LP spool 34.

Referring to FIG. 1, a control system 100 of the present disclosure may be in communication with an engine shaft of the turbomachine 10. For example, the control system 100 may be in communication with a first rotatable component 102, e.g., the HP spool or shaft 30 and/or the LP spool or shaft 34.

Figure 2:
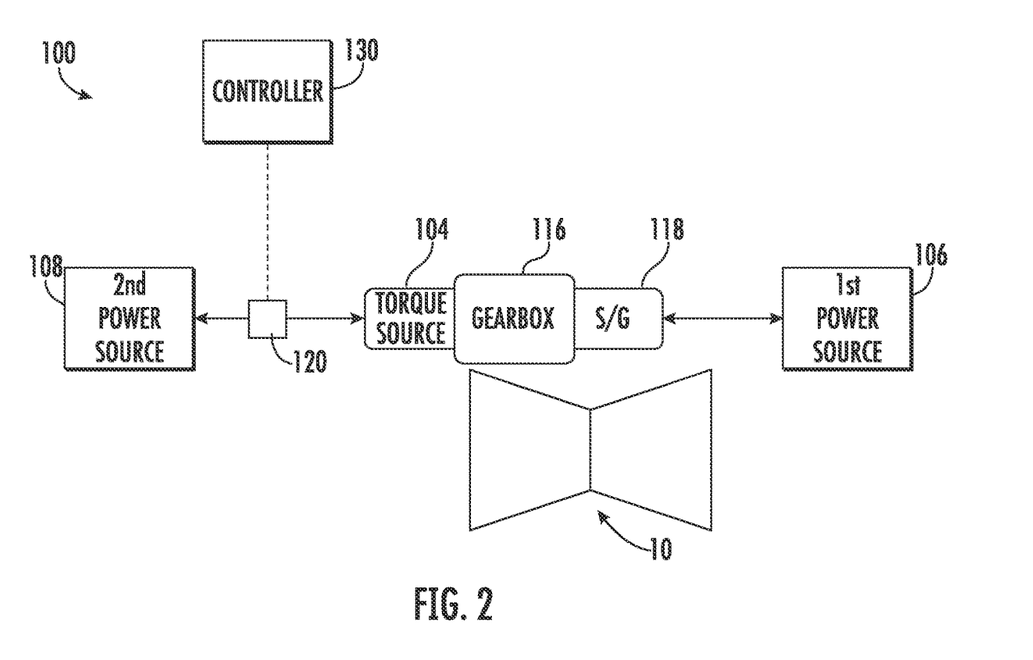
FIG. 2 provides a block diagram of a control system for controlling the gas turbine engine in accordance with exemplary embodiments of the present disclosure.
Figure 3:
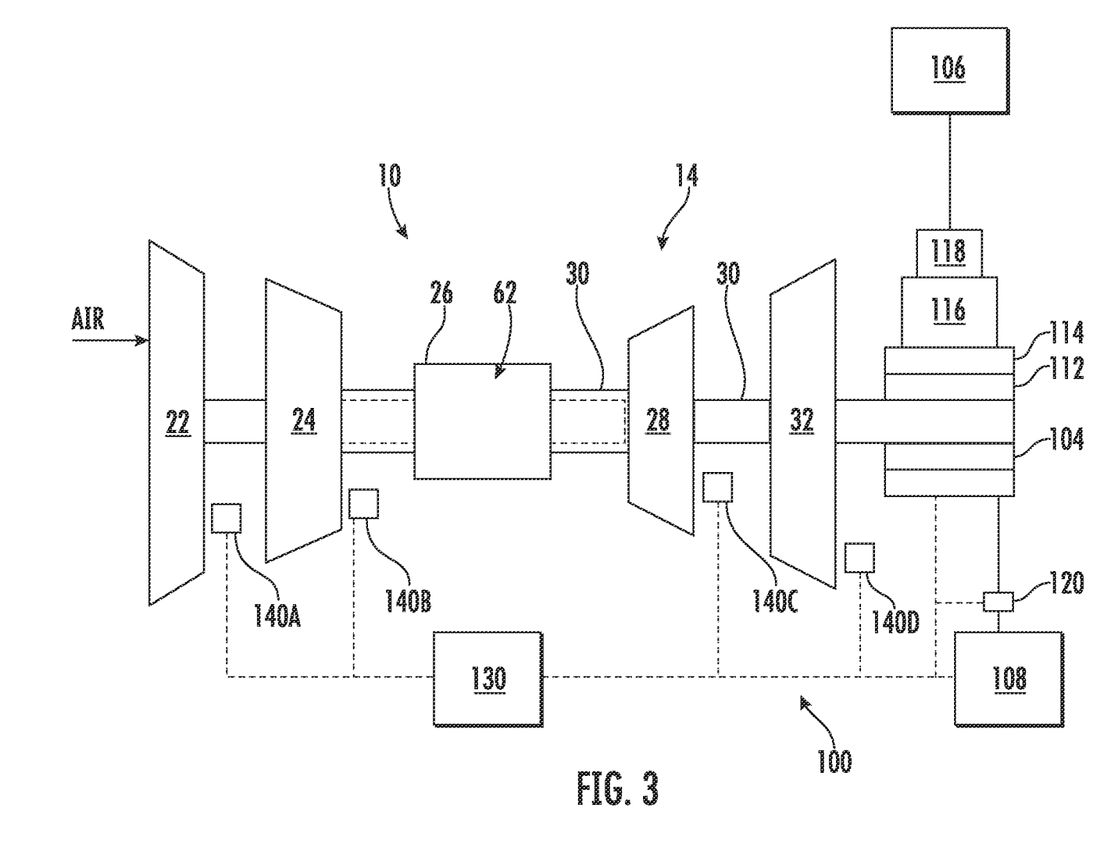
FIG. 3 provides a schematic view of the control system and the gas turbine engine in accordance with exemplary embodiments of the present disclosure.

FIGS. 2 and 3 provides a schematic view of the core turbine engine 14 of the turbofan 10 of FIG. 1 and depicts a control system 100 operable to control the turbofan 10 and a second power source 116 thereof. In some embodiments, all of the components of the control system 100 are onboard the turbofan 10. In other embodiments, some of the components of the control system 100 are onboard the turbofan 10 and some are offboard the turbofan 10. For instance, some of the offboard components can be mounted to a wing, fuselage, or other suitable structure of an aerial vehicle to which the turbofan 10 is mounted.

Referring to FIGS. 2 and 3, the control system 100 includes a torque source 104, a first power source 106, a second power source 108, and a controller 130.

In exemplary embodiments, the first power source 106 is operatively coupled with the first rotatable component 102. The second power source 108 is selectively coupled with the first rotatable component 102. The torque source 104 is operatively coupled with the first rotatable component 102 and is selectively coupled to the first power source 106 and the second power source 108.

In one exemplary embodiment, the torque source 104 is operatively coupled with the first rotatable component 102, e.g., the HP spool or shaft 30. In other exemplary embodiments, the torque source 104 is operatively coupled with the first rotatable component 102, e.g., the LP spool or shaft 34. It is contemplated that the first rotatable component 102 may be an engine shaft of the turbomachine 10.

For example, in the depicted embodiment of FIG. 3, the torque source 104 is directly operatively coupled to the HP spool 30. In other embodiments, the torque source 104 can be indirectly coupled with the HP spool 30. For instance, the torque source 104 can be connected to a shaft that is in turn operatively coupled with the HP spool 30. For example, the torque source 104 can be operatively coupled with a shaft that is operatively coupled with the HP spool 30 via a gearbox and/or other speed reduction device. The control system 100 and torque source 104 of the present disclosure may be operatively coupled with the HP spool 30 or the LP spool 34.

In an exemplary embodiment, the torque source 104 is an engine alternator. For example, the torque source 104 may be a permanent magnet alternator (PMA). The torque source may include a rotor 112 and a stator 114. The rotor 112 operatively couples the torque source 104 with the HP spool 30 and rotates within the stator 114 about an axis of rotation. As described herein, the alternator or torque source 104 can operate as an electric motor to drive the HP spool or shaft 30 following shutdown of the engine. With the alternator or torque source 104 operating as an electric motor and electrical power is directed thereto, the rotor 112 is driven by an interaction between windings and/or magnetic fields of the rotor 112 and stator 114 as will be appreciated by those of skill in the art. The rotation of the rotor 112 causes the torque source 104 to apply torque to and rotate the HP spool 30 at a low speed following engine shutdown.

The control system 100 also includes a second power source 108. In an exemplary embodiment, the second power source is a rechargeable battery. It is contemplated that the second power source 108 can be any suitable power source to provide power to and rotate the first rotatable component 102 at a low speed following engine shutdown. For example, in exemplary embodiments, the second power source 108 can be any suitable power source to provide power to and rotate the first rotatable component 102 at a speed of less than 100 RPM following engine shutdown. In other exemplary embodiments, the second power source 108 can be any suitable power source to provide power to and rotate the first rotatable component 102 at a speed of less than 10 RPM following engine shutdown. In other exemplary embodiments, the second power source 108 can be any suitable power source to provide power to and rotate the first rotatable component 102 at a speed of less than 2 RPM following engine shutdown. The second power source 108 can be located onboard the turbofan 10. In an exemplary embodiment, the second power source 108 can be mounted to a front frame portion of the fan casing 40. In other exemplary embodiments, the second power source 108 can be mounted to other frame portions of the engine 10.

Importantly, the second power source 108 of the present disclosure provides power to and rotates the first rotatable component 102 at a low speed following engine shutdown. In this manner, the second power source 108 is a lower power source, as described above, than a first power source 106 which is a main engine starter system that has limited duty cycles, significant costs per engagement, and often requires a pilot to be present in the cockpit during operation. The first power source 106 is a larger generator of power which can't provide the low speed operation that the second power source 108 of the present disclosure provides. Furthermore, the second power source 108 being a smaller power source than the first power source 106, as described above, allows the system 100 of the present disclosure to be easily integrated or retrofitted to existing and new engines.

In an exemplary embodiment, the first power source 106 provides electrical power to the torque source 104 to apply torque to and rotate the first rotatable component 102 at an initial engine start of the turbomachine 10. For example, referring to FIG. 2, the first power source is in communication with a starter/generator 118, a gearbox 116, and to the first torque source 104.

The turbofan 10 includes a computing system. Particularly, for this embodiment, the turbofan 10 includes a computing system having one or more computing devices, including a controller 130 configured to control the turbofan 10, and in this embodiment, the second power source 108 and other components of the control system 100. The controller 130 can include one or more processor(s) and associated memory device(s) configured to perform a variety of computer-implemented functions and/or instructions (e.g., performing the methods, steps, calculations and the like and storing relevant data as disclosed herein). The instructions, when executed by the one or more processors, can cause the one or more processor(s) to perform operations, such as causing the second power source 108 to provide power to and rotate the first rotatable component 102 after engine shutdown.

Additionally, the controller 130 can include a communications module to facilitate communications between the controller 130 and various components of the aerial vehicle and other electrical components of the engine 10. The communications module can include a sensor interface (e.g., one or more analog-to-digital converters) to permit signals transmitted from the one or more sensors to be converted into signals that can be understood and processed by the one or more processor(s). It should be appreciated that the sensors can be communicatively coupled to the communications module using any suitable means. For example, the sensors can be coupled to the sensor interface via a wired connection. However, in other embodiments, the sensors can be coupled to the sensor interface via a wireless connection, such as by using any suitable wireless communications protocol. As such, the processor(s) can be configured to receive one or more signals or outputs from the sensors, such as one or more operating conditions/parameters.

As used herein, the term "processor" refers not only to integrated circuits referred to in the art as being included in a computing device, but also refers to a controller, a microcontroller, a microcomputer, a programmable logic controller (PLC), an application specific integrated circuit, and other programmable circuits. The one or more processors can also be configured to complete the required computations needed to execute advanced algorithms. Additionally, the memory device(s) can generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) can generally be configured to store suitable computer-readable instructions that, when implemented by the processor(s), configure the controllers 130 to perform the various functions described herein. The controller 130 can be configured in substantially the same manner as the exemplary computing device of the computing system 500 described below with reference to FIG. 6 (and may be configured to perform one or more of the functions of the exemplary method (400) described herein).

The controller 130 may be a system of controllers or a single controller. The controller 130 may be a controller dedicated to control of the second power source 108 and associated electrical components or can be an engine controller configured to control the turbofan 10 as well as the second power source 108, control system 100, and its associated electrical components. The controller 130 can be, for example, an Electronic Engine Controller (EEC) or an Electronic Control Unit (ECU) of a Full Authority Digital Engine Control (FADEC) system.

The control system 100 can include one or more power management electronics or electrical control devices 120, such as inverters, converters, rectifiers, devices operable to control the flow of electrical current, etc. For instance, one or more of the control devices 120 can be operable to condition and/or convert electrical power (e.g., from AC to DC or vice versa). Further, one or more of the control devices 120 can be operable to control the electrical power provided to the torque source 104 by the second power source 108. Although, the control devices 120 are shown schematically in FIGS. 2 and 3 as separate from the second power source 108 and the controller 130, it will be appreciated that one, some, or all of control devices 120 can be located onboard the second power source 108 and/or the controller 130.

The turbofan 10 may also include one or more sensors for sensing and/or monitoring various engine operating conditions and/or parameters during operation. For instance, one or more sensors 140A can be positioned at the LP compressor 22, one or more sensors 140B can be positioned at the HP compressor 24, one or more sensors 140C can be positioned at the HP turbine 28, and one or more sensors 140D can be positioned at the LP turbine 32, among other possible locations. The sensors 140A, 140B, 140C, 140D can sense or measure various engine conditions, e.g., pressures and temperatures, and one or more signals may be routed from the one or more sensors 140A, 140B, 140C, 140D to the controller 130 for processing. Accordingly, the controller 130 is communicatively coupled with the one or more sensors 140A, 140B, 140C, 140D, e.g., via a suitable wired or wireless communication link. It will be appreciated that the turbofan 10 can include other sensors at other suitable stations along the core air flowpath.

In an exemplary embodiment, the one or more sensors 140A, 140B, 140C, 140D may monitor a temperature of the engine and the controller 130 may be configured to shut down the second power source 108 once the engine has cooled to a desired temperature. In exemplary embodiments, the one or more sensors 140A, 140B, 140C, 140D may include resistance temperature detectors.

FIGS. 2 and 3 provide a block diagram of the control system 100 operable to control operation of the engine 10. The engine 10 is operable to include motor controller 130 and second power source 108 in communication with a torque source 104 to rotate a first rotatable component 102 at a low speed following engine shutdown. Advantageously, this prevents rotor thermal bow by rotating the engine at a very low speed for a fixed number of minutes or until an integrated power source such a battery or capacitor is depleted. For example, in an exemplary embodiment, the one or more processors of the controller 130 control the second power source 108 to provide power to and rotate the first rotatable component 102 for a duration of at least ninety (90) minutes. In another exemplary embodiment, the one or more processors of the controller 130 control the second power source 108 to provide power to and rotate the first rotatable component 102 until the second power source 108 is depleted. In an exemplary embodiment, the one or more processors of the controller 130 control the second power source 108 to provide less than 1 kW of electrical power to rotate the first rotatable component 102. In an exemplary embodiment, the one or more processors of the controller 130 control the second power source 108 to provide power to and rotate the first rotatable component 102 at a speed of less than 100 RPM. In another exemplary embodiment, the one or more processors of the controller 130 control the second power source 108 to provide power to and rotate the first rotatable component 102 at a speed of less than 10 RPM.

As noted above, the control system 100 can include one or more devices, such as sensors, controllers, processors, memory devices, controllable devices, electric machines, etc. that can monitor and control various aspects of the engine 10. Particularly, the second power source 108 of the control system 100 can be controlled to provide power to the first rotatable component 102, e.g., the HP spool 30, e.g., following shutdown of the engine. For instance, a computing system (e.g., controller 130) can receive an input indicating an engine shutdown of the turbomachine 10, and in response to the received input indicating the engine shutdown, the computing system can cause the second power source 108 to provide power to and rotate the first rotatable component 102. For example, a computing system (e.g., controller 130) can receive an input indicating an engine shutdown of the turbomachine 10, and in response to the received input indicating the engine shutdown, the computing system can cause the second power source 108 to provide power to and rotate the first rotatable component 102, the second power source 108 provides electrical power to the torque source 104 to apply torque to and rotate the first rotatable component 102. In this way, the control system 100 of the present disclosure prevents rotor thermal bow by rotating the engine at a very low speed for a fixed number of minutes or until an integrated power source is depleted.

Referring to FIGS. 2 and 3, a computing system of the aerial vehicle (e.g., the controller 130) can receive one or more inputs indicating an engine shutdown of the turbomachine 10. The one or more inputs can be in the form of analog or digital electrical signals, for example. In other embodiments, the controller 130 can receive the input in response to when the first power source 106 stops running, i.e., goes away and stops providing power to the torque source 104. The controller 130 may also receive the one or more inputs in response to a user input or automatically based on commands from a flight control system.

Referring to FIGS. 2 and 3, in response to the received input indicating the engine shutdown of the turbomachine 10, the one or more processors of the controller 130 are configured to cause the second power source 108 to provide power to and rotate the first rotatable component 102. For example, in response to the received input indicating the engine shutdown of the turbomachine 10, when the one or more processors of the controller 130 cause the second power source 108 to provide power to and rotate the first rotatable component 102, the second power source 108 provides electrical power to the torque source 104 to apply torque to and rotate the first rotatable component 102. Advantageously, this prevents rotor thermal bow by rotating the engine at a very low speed for a fixed number of minutes or until an integrated power source is depleted.

Figure 5:
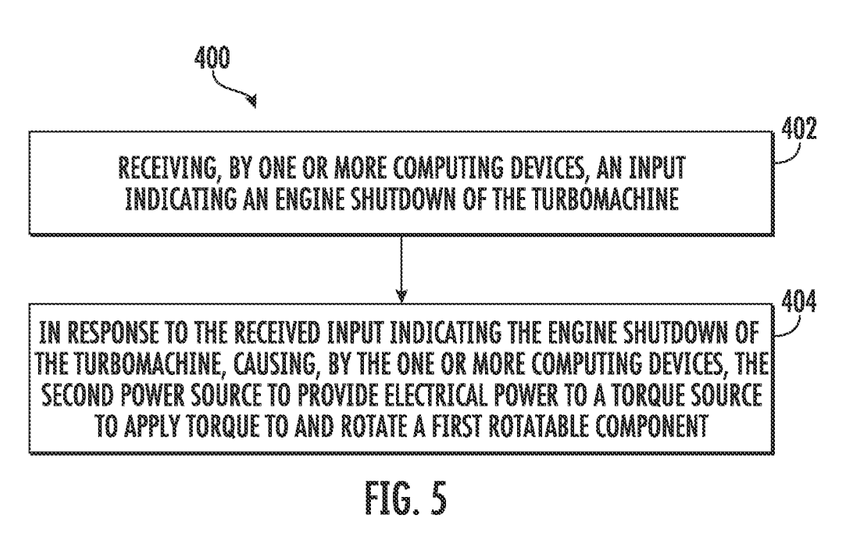
FIG. 5 is a flow diagram of an exemplary method of mitigating bowed rotor for a turbomachine having a first power source and a second power source in accordance with exemplary embodiments of the present disclosure.

FIG. 5 provides a flow diagram of an exemplary method (400) of mitigating bowed rotor for a turbomachine having a first power source and a second power source in accordance with exemplary embodiments of the present disclosure. For instance, the exemplary method (400) may be utilized for operating the engine 10 described herein. It should be appreciated that the method (400) is discussed herein only to describe exemplary aspects of the present subject matter and is not intended to be limiting.

At (402), the method (400) includes receiving, by one or more computing devices, an input indicating an engine shutdown of the turbomachine. For instance, the controller 130 can receive the input in response to when the first power source 106 stops running, i.e., goes away and stops providing power to the torque source 104.

At (404), in response to the received input indicating the engine shutdown of the turbomachine, the method (400) includes causing, by the one or more computing devices, the second power source 108 to provide electrical power to a torque source 104 to apply torque to and rotate a first rotatable component 102. For instance, as shown in FIGS. 2 and 3, the controller 130 can cause the electrical control device 120 to direct electric power from the second power source 108 to the torque source 104 to apply torque to and rotate the first rotatable component 102. Advantageously, this prevents rotor thermal bow by rotating the engine at a very low speed for a fixed number of minutes or until an integrated power source is depleted.

Figure 6:
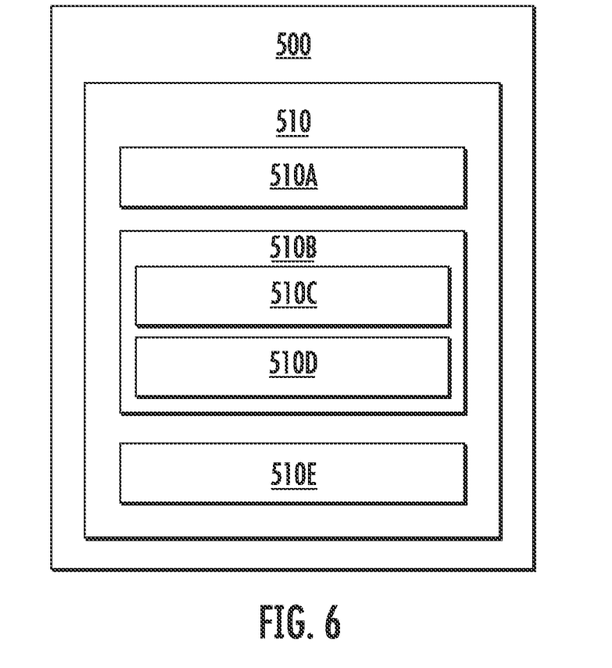
FIG. 6 is an example computing system according to example embodiments of the present disclosure.

FIG. 6 provides an example computing system 500 according to example embodiments of the present disclosure. The computing systems (e.g., the controller 130) described herein may include various components and perform various functions of the computing system 500 described below, for example.

As shown in FIG. 6, the computing system 500 can include one or more computing device(s) 510. The computing device(s) 510 can include one or more processor(s) 510A and one or more memory device(s) 510B. The one or more processor(s) 510A can include any suitable processing device, such as a microprocessor, microcontroller, integrated circuit, logic device, and/or other suitable processing device. The one or more memory device(s) 510B can include one or more computer-readable media, including, but not limited to, non-transitory computer-readable media, RAM, ROM, hard drives, flash drives, and/or other memory devices.

The one or more memory device(s) 510B can store information accessible by the one or more processor(s) 510A, including computer-readable instructions 510C that can be executed by the one or more processor(s) 510A. The instructions 510C can be any set of instructions that when executed by the one or more processor(s) 510A, cause the one or more processor(s) 510A to perform operations. In some embodiments, the instructions 510C can be executed by the one or more processor(s) 510A to cause the one or more processor(s) 510A to perform operations, such as any of the operations and functions for which the computing system 500 and/or the computing device(s) 510 are configured, operations for electrically assisting a turbomachine during transient operation (e.g., method (400)), and/or any other operations or functions of the one or more computing device(s) 510. Accordingly, the method (400) may be a computer-implemented method, such that each of the steps of the exemplary method (400) are performed by one or more computing devices, such as the exemplary computing device 510 of the computing system 500. The instructions 510C can be software written in any suitable programming language or can be implemented in hardware. Additionally, and/or alternatively, the instructions 510C can be executed in logically and/or virtually separate threads on processor(s) 510A. The memory device(s) 510B can further store data 510D that can be accessed by the processor(s) 510A. For example, the data 510D can include models, databases, etc.

The computing device(s) 510 can also include a network interface 510E used to communicate, for example, with the other components of system 500 (e.g., via a network). The network interface 510E can include any suitable components for interfacing with one or more network(s), including for example, transmitters, receivers, ports, controllers, antennas, and/or other suitable components. One or more external devices, such as fuel control device(s) 150 and electrical control device(s) 120, can be configured to receive one or more commands from the computing device(s) 510 or provide one or more commands to the computing device(s) 510.

Figure 4A:
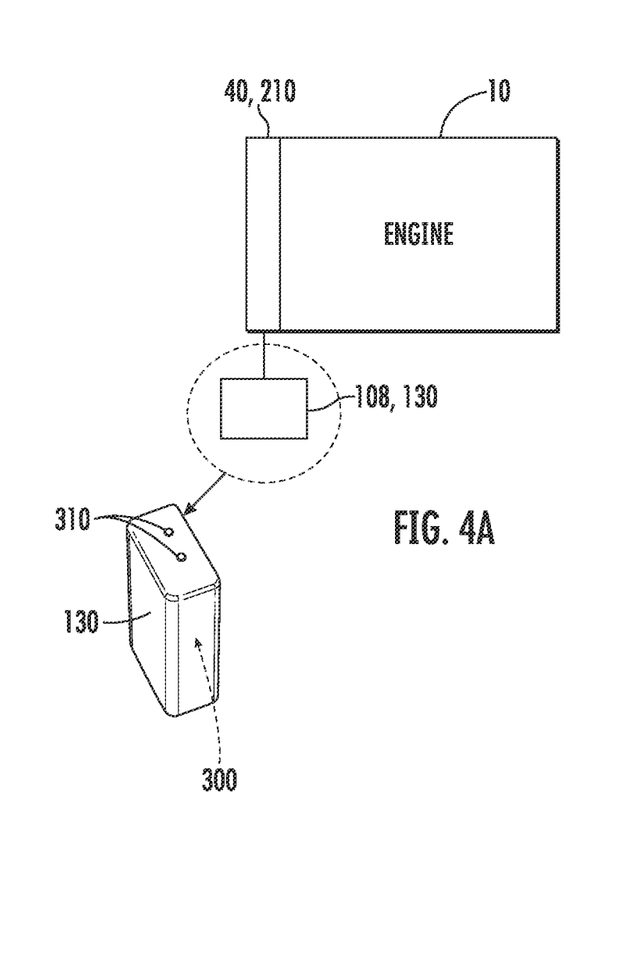
FIG. 4A is a perspective view of an exemplary control system and gas turbine engine in accordance with exemplary embodiments of the present disclosure.
Figure 4B:
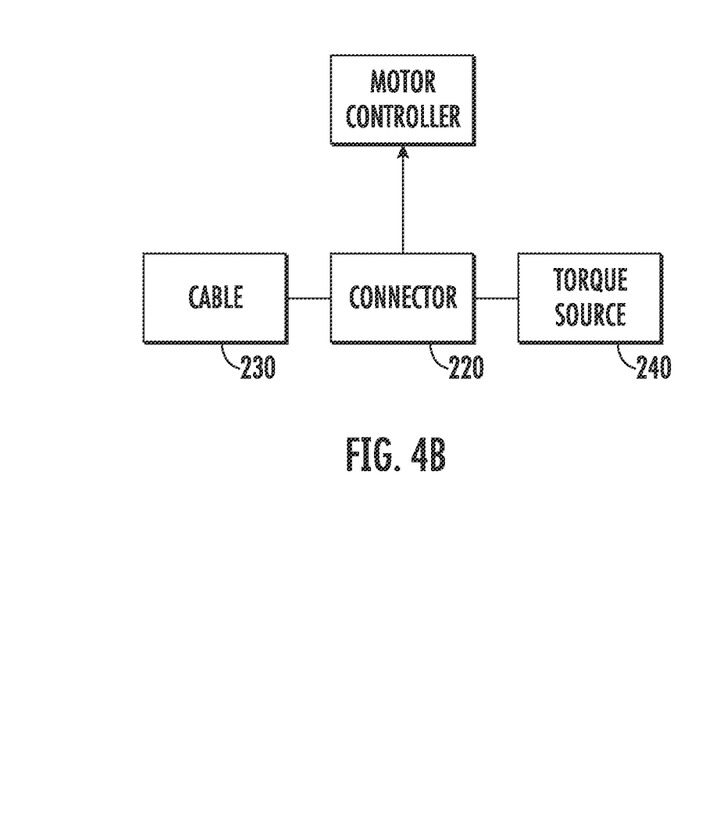
FIG. 4B is a perspective view of an electrical connector for communicating with a control system of an exemplary gas turbine engine in accordance with exemplary embodiments of the present disclosure.

Referring to FIGS. 4A and 4B, a control system 100 of the present disclosure can be located onboard the turbofan 10. In an exemplary embodiment, the controller 130 and the second power source 108 can be mounted to a front frame portion 210 of the fan casing 40. In other exemplary embodiments, the controller 130 and the second power source 108 can be mounted to other frame portions of the engine 10. Referring to FIG. 4B, in an exemplary embodiment, an electrical connector 220 is included between a cable assembly 230 and a torque source 240. In an exemplary embodiment, the torque source 240 may be a permanent magnet alternator (PMA). The addition of the electrical connector 220 allows the for communication with the control system 100 including the controller 130 and the second power source 108.

A control system 100 of the present disclosure does not require a change to the mechanical hardware of an engine and facilities simple retrofit with existing engines. The motor controller 130 and the second power source 108 can be integrated into a jumper harness with a simple bolt-on. The system of the present disclosure can be passive and simply rotate the engine after shutdown until the second power source 108 is depleted. The second power source 108 is then able to recharge at the next engine operation. Furthermore, the second power source 108, e.g., a rechargeable battery, is recharged by a separate power source while the second power source 108 is not being used. For example, the second power source 108, e.g., a rechargeable battery, is recharged by a separate power source such as the first power source 106, e.g., a starter, motor, generator, or other ground power source, while the second power source 108 is not being used.

Figure 7:
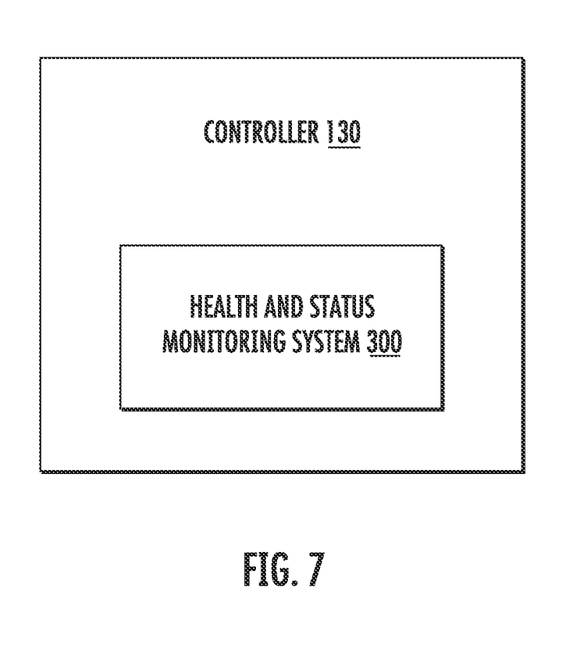
FIG. 7 is an example controller including a built-in health and status monitoring system according to example embodiments of the present disclosure.

Furthermore, referring to FIGS. 2, 4A, and 7, the control system 100 of the present disclosure includes a controller 130 having a built-in health and status monitoring system 300. The built-in health and status monitoring system 300 is able to indicate a status of the second power source 108, e.g., a rechargeable battery. For example, the health and status monitoring system 300 of the controller 130 is able to indicate a charge state of the second power source 108; a health of the second power source 108 in terms of its life, e.g., is the second power source 108 new or old and needs to be replaced soon because it will not be able to take another charge cycle; provide system self-tests, e.g., provide self-tests that monitor current draws of the motor when on and determine if the motor is within its limits such as drawing as many amps as expected, and/or any other status indications of the second power source 108 and/or system 100 as desired for particular needs and applications of the system 100. Referring to FIG. 4A, in an exemplary embodiment, the health and status monitoring system 300 of the controller 130 includes indicators 310 such as LED lights that change color on the controller 130 itself to indicate the health of the system 100. For example, different colored LED lights, e.g., green, yellow, and red, may be used to provide indication of the system 100 as described above. It is also contemplated that other indicator systems may be used to provide such indications of the system 100.

Furthermore, referring to FIGS. 2, 4A, and 7, the built-in health and status monitoring system 300 of the controller 130 is able to indicate a status of a motor of the system. For example, the built-in health and status monitoring system 300 of the controller 130 is able to indicate a status of a torque source 104. The built-in health and status monitoring system 300 of the controller 130 is able to indicate any desired status, e.g., a health status, of a motor or torque source 104.

It is contemplated that the turbomachines and methods of the present disclosure may be implemented on an aircraft, helicopter, automobile, boat, submarine, train, unmanned aerial vehicle or drone and/or on any other suitable vehicle. While the present disclosure is described herein with reference to an aircraft implementation, this is intended only to serve as an example and not to be limiting. One of ordinary skill in the art would understand that the turbomachines and methods of the present disclosure may be implemented on other vehicles without deviating from the scope of the present disclosure.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

Further aspects of the invention are provided by the subject matter of the following clauses:

1. A turbomachine for a vehicle, comprising: a first rotatable component; a first power source operatively coupled with the first rotatable component; a second power source selectively coupled with the first rotatable component; and a controller having one or more processors and one or more memory devices, the one or more memory devices storing instructions that when executed by the one or more processors cause the one or more processors to perform operations, in performing the operations, the one or more processors are configured to: receive an input indicating an engine shutdown of the turbomachine; and in response to the engine shutdown, cause the second power source to provide power to and rotate the first rotatable component.

2. The turbomachine of any preceding clause, further comprising a torque source operatively coupled with the first rotatable component and selectively coupled to the first power source and the second power source.

3. The turbomachine of any preceding clause, wherein when the one or more processors cause the second power source to provide power to and rotate the first rotatable component, the second power source provides electrical power to the torque source to apply torque to and rotate the first rotatable component.

4. The turbomachine of any preceding clause, wherein the first power source provides electrical power to the torque source to apply torque to and rotate the first rotatable component at an initial engine start of the turbomachine.

5. The turbomachine of any preceding clause, wherein the second power source comprises a rechargeable battery, and wherein the torque source comprises an engine alternator.

6. The turbomachine of any preceding clause, wherein the controller includes a health and status monitoring system that indicates a status of the rechargeable battery.

7. The turbomachine of any preceding clause, wherein the controller includes a health and status monitoring system that indicates a status of the torque source.

8. The turbomachine of any preceding clause, wherein the one or more processors of the controller control the second power source to provide power to and rotate the first rotatable component at a speed of less than 10 RPM.

9. The turbomachine of any preceding clause, wherein the one or more processors of the controller control the second power source to provide less than 1 kW of electrical power to rotate the first rotatable component.

10. The turbomachine of any preceding clause, wherein the one or more processors of the controller control the second power source to provide power to and rotate the first rotatable component for a duration of at least ninety (90) minutes.

11. The turbomachine of any preceding clause, wherein the one or more processors of the controller control the second power source to provide power to and rotate the first rotatable component until the second power source is depleted.

12. The turbomachine of any preceding clause, wherein the first rotatable component is an engine shaft of the turbomachine.

13. A turbomachine for a vehicle, comprising: a first rotatable component; a torque source operatively coupled with the first rotatable component; a first power source coupled to the torque source; a second power source selectively coupled to the torque source; and a controllable device operably coupled to the second power source such that the controllable device causes the second power source to provide electrical power to the torque source to apply torque to and rotate the first rotatable component in response to an engine shutdown of the turbomachine.

14. The turbomachine of any preceding clause, wherein the first power source provides electrical power to the torque source to apply torque to and rotate the first rotatable component at an initial engine start of the turbomachine.

15. The turbomachine of any preceding clause, wherein the second power source comprises a rechargeable battery, and wherein the torque source comprises an engine alternator.

16. The turbomachine of any preceding clause, wherein the controllable device includes a health and status monitoring system that indicates a status of the rechargeable battery.

17. The turbomachine of any preceding clause, wherein the controllable device causes the second power source to provide power to and rotate the first rotatable component at a speed of less than 10 RPM.

18. The turbomachine of any preceding clause, wherein the controllable device causes the second power source to provide less than 1 kW of electrical power to the torque source to apply torque to and rotate the first rotatable component in response to the engine shutdown of the turbomachine.

19. A method of mitigating bowed rotor for a turbomachine having a first power source and a second power source, the method comprising: receiving, by one or more computing devices, an input indicating an engine shutdown of the turbomachine; in response to the received input indicating the engine shutdown of the turbomachine, causing, by the one or more computing devices, the second power source to provide electrical power to a torque source to apply torque to and rotate a first rotatable component.

20. The method of any preceding clause, wherein the first power source provides electrical power to the torque source to apply torque to and rotate the first rotatable component at an initial engine start of the turbomachine, wherein the second power source comprises a rechargeable battery, and wherein the torque source comprises an engine alternator.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A turbomachine for a vehicle, comprising:
   a first rotatable component;
   a first power source operatively coupled with the first rotatable component;
   a second power source selectively coupled with the first rotatable component;
   a torque source operatively coupled directly to the first rotatable component and selectively coupled to the first power source and the second power source; and
   a controller having one or more processors and one or more memory devices, the one or more memory devices storing instructions that when executed by the one or more processors cause the one or more processors to perform operations, in performing the operations, the one or more processors are configured to:
   receive an input indicating an engine shutdown of the turbomachine, the input is received in response to when the first power source stops running and stops providing power to the torque source; and
   in response to the engine shutdown, cause the second power source to provide power to and rotate the first rotatable component,
   wherein the one or more processors of the controller control the second power source to provide power to and rotate the first rotatable component until the second power source is completely depleted,
   wherein the second power source comprises a rechargeable battery, and
   wherein the controller includes a health and status monitoring system that indicates a status of the rechargeable battery and a health status of the torque source, and wherein the first rotatable component comprises a low pressure spool of a gas turbine engine.

2. The turbomachine of claim 1, wherein when the one or more processors cause the second power source to provide power to and rotate the first rotatable component, the second power source provides electrical power to the torque source to apply torque to and rotate the first rotatable component.

3. The turbomachine of claim 1, wherein the first power source provides electrical power to the torque source to apply torque to and rotate the first rotatable component at an initial engine start of the turbomachine.

4. The turbomachine of claim 1, wherein the torque source comprises an engine alternator.

5. The turbomachine of claim 4, wherein the health and status monitoring system indicates an ability to hold a charge of the rechargeable battery.

6. The turbomachine of claim 1, wherein the health and status monitoring system includes a plurality of different colored LED lights that change colors to indicate the status of the rechargeable battery and the health status of the torque source.

7. The turbomachine of claim 1, wherein the one or more processors of the controller control the second power source to provide power to and rotate the first rotatable component at a speed of less than 10 RPM.

8. The turbomachine of claim 1, wherein the one or more processors of the controller control the second power source to provide less than 1 kW of electrical power to rotate the first rotatable component.

9. The turbomachine of claim 1, wherein the one or more processors of the controller control the second power source to provide power to and rotate the first rotatable component for a duration of at least ninety (90) minutes.

10. The turbomachine of claim 1, wherein the first rotatable component is an engine shaft of the turbomachine.

11. The turbomachine of claim 1, wherein the controller is an engine controller configured to control the turbomachine, the second power source, a control system, and associated electrical components.

12. The turbomachine of claim 1, wherein the controller is a system of controllers dedicated to only control the second power source.

13. A turbomachine for a vehicle, comprising:
a first rotatable component;
a torque source operatively coupled directly to the first rotatable component;
a first power source coupled to the torque source;
a second power source selectively coupled to the torque source; and
a controllable device operably coupled to the second power source such that the controllable device causes the second power source to provide electrical power to the torque source to apply torque to and rotate the first rotatable component in response to an engine shutdown of the turbomachine and in response to when the first power source stops running and stops providing power to the torque source,
wherein the controllable device causes the second power source to provide electrical power to the torque source to apply torque to and rotate the first rotatable component until the second power source is completely depleted,
wherein the second power source comprises a rechargeable battery, and
wherein the controllable device includes a health and status monitoring system that indicates a status of the rechargeable battery and a health status of the torque source, wherein the health and status monitoring system includes a plurality of different colored LED lights that change colors to indicate the status of the rechargeable battery and the health status of the torque source, and wherein the first rotatable component comprises a low pressure spool of a gas turbine engine.

14. The turbomachine of claim 13, wherein the first power source provides electrical power to the torque source to apply torque to and rotate the first rotatable component at an initial engine start of the turbomachine.

15. The turbomachine of claim 13, wherein the torque source comprises an engine alternator.

16. The turbomachine of claim 15, wherein the health and status monitoring system indicates an ability to hold a charge of the rechargeable battery.

17. The turbomachine of claim 13, wherein the controllable device causes the second power source to provide power to and rotate the first rotatable component at a speed of less than 10 RPM.

18. The turbomachine of claim 13, wherein the controllable device causes the second power source to provide less than 1 kW of electrical power to the torque source to apply torque to and rotate the first rotatable component in response to the engine shutdown of the turbomachine.

19. A method of mitigating bowed rotor for a turbomachine having a first power source, a second power source, and a torque source, the method comprising:
receiving, by one or more computing devices, an input indicating an engine shutdown of the turbomachine, the input is received in response to when the first power source stop running and stops providing power to the torque source; and,
in response to the received input indicating the engine shutdown of the turbomachine, causing, by the one or more computing devices, the second power source to provide electrical power to the torque source to apply torque to and rotate a first rotatable component directly coupled to the torque source until the second power source is completely depleted, wherein the first power source provides electrical power to the torque source to apply torque to and rotate the first rotatable component at an initial engine start of the turbomachine, wherein the second power source comprises a rechargeable battery, wherein the torque source comprises an engine alternator, and wherein a health and status monitoring system indicates an ability to hold a charge of the rechargeable battery and a health status of the torque source, and wherein the first rotatable component comprises a low pressure spool of a gas turbine engine.

* * * * *